United States Patent
Mauvy et al.

(10) Patent No.: US 10,407,303 B2
(45) Date of Patent: Sep. 10, 2019

(54) USE OF A MAGNESIUM-BASED MATERIAL FOR PRODUCING DIHYDROGEN OR ELECTRICITY

(71) Applicants: UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: Fabrice Claude Michel Mauvy, Canejan (FR); Jean-Louis Bobet, Pessac (FR); Jocelyn Sabatier, Villenave d'Ornon (FR); Frédéric Bos, Libourne (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/765,897

(22) PCT Filed: Oct. 6, 2016

(86) PCT No.: PCT/EP2016/073905
§ 371 (c)(1),
(2) Date: Apr. 4, 2018

(87) PCT Pub. No.: WO2017/060368
PCT Pub. Date: Apr. 13, 2017

(65) Prior Publication Data
US 2018/0282158 A1    Oct. 4, 2018

(30) Foreign Application Priority Data

Oct. 6, 2015 (FR) ...................................... 15 59518

(51) Int. Cl.
*H01M 8/04* (2016.01)
*C01B 3/08* (2006.01)
(Continued)

(52) U.S. Cl.
CPC .................. *C01B 3/08* (2013.01); *B01J 7/02* (2013.01); *C01B 3/06* (2013.01); *C01B 3/065* (2013.01);
(Continued)

(58) Field of Classification Search
CPC ...................................................... H01M 8/04
See application file for complete search history.

(56) References Cited

U.S. PATENT DOCUMENTS

2010/0266488 A1    10/2010    De Rango et al.

FOREIGN PATENT DOCUMENTS

CN              101811667          8/2010

OTHER PUBLICATIONS

Carsten et al. (International Journal of Hydrogen Energy vol. 35, Iss. 23, 2010 pp. 12829-12836).*

(Continued)

*Primary Examiner* — Jacob B Marks
(74) *Attorney, Agent, or Firm* — B. Aaron Schulman, Esq.; Stites & Harbison, PLLC

(57) ABSTRACT

Use of a material (3) for producing hydrogen or electricity, wherein the material comprises at least 50% by weight of a reagent for hydrolysis upon contact with an aqueous solution to obtain hydrogen. The reagent comprises:
  a first compound chosen from magnesium metal, magnesium hydride, and mixtures thereof, and
  a second compound alloyed with the first compound, wherein the second compound is chosen from graphite, carbon fibers, and mixtures thereof.
The first compound represents at least 75% by weight of the reagent, while the second compound represents between 1% and 25% by weight of the reagent.
Use of a capsule containing the material.
Method and corresponding production device.

21 Claims, 4 Drawing Sheets

(51) Int. Cl.
  *C01B 3/06* (2006.01)
  *B01J 7/02* (2006.01)
  *F02B 43/10* (2006.01)
  *H01M 8/065* (2016.01)
  *F02B 63/04* (2006.01)

(52) U.S. Cl.
  CPC ............. *F02B 43/10* (2013.01); *H01M 8/065* (2013.01); *F02B 63/04* (2013.01); *Y02E 60/362* (2013.01)

(56) References Cited

OTHER PUBLICATIONS

Kojima Y et al: "Hydrogen generation by hydrolysis reaction of magnesium hydride", Journal of Materials Science, Kluwer Academic Publishers, BO, vol. 39, No. 6, Mar. 1, 2004 (Mar. 1, 2004), pp. 2227-2229, XP019210215, ISSN: 1573-4803, DOI: 10.1023/B:JMSC.0000017794.92899.BD the whole document.
Preliminary Search Report for FR 1559518, dated Jun. 13, 2016.
Written Opinion of the International Search Authority for PCT/EP2016/073905, dated Oct. 31, 2016.
International Search Report for PCT/EP2016/073905, dated Oct. 31, 2016.

\* cited by examiner

USE OF A MAGNESIUM-BASED MATERIAL FOR PRODUCING DIHYDROGEN OR ELECTRICITY

BACKGROUND OF THE INVENTION

Field of the Invention

The present invention relates to the use of a material for producing hydrogen or electricity, wherein the material is based on magnesium.

In one particular application, the hydrogen is converted into electricity in a fuel cell and the electricity so produced is used to power an electric motor, for example a bicycle booster motor.

Description of Related Art

Hydrogen production is one of the main challengers to replace fossil fuels and move towards the production of "green" and sustainable energy. In fact, gaseous dihydrogen, which we will call "hydrogen" in the present application, represents a very good alternative fuel because it offers high power density, while the products of its combustion or its use in a fuel cell are non-polluting. In particular, the combustion of hydrogen does not generate $CO_2$ (carbon dioxide).

In recent decades, much effort has been devoted to the production of hydrogen in large quantities. In this context, catalytic reforming of fossil fuels remains the method of choice today. However, electrolysis and plant fermentation are also considered as alternative possibilities.

The production of hydrogen on the basis of the hydrolysis reaction of various materials is another avenue of investigation. This method has the advantage that no additional energy is required (low temperature operation), while the method makes it possible to produce hydrogen in a delocalised manner and at a purity that is suitable for many applications.

Many types of materials have already been considered, including complex hydrides, metals, metal hydrides and intermetallics. Of these materials, magnesium has attracted attention for hydrogen production by hydrolysis due to its high electrochemical activity, low density and low cost. In addition, it is a non-toxic and abundant product. Magnesium and magnesium hydride react with water according to the following respective equations:

$$Mg + 2H_2O = Mg(OH)_2 + H_2 \quad (Eq.1)$$

$$MgH_2 + 2H_2O = Mg(OH)_2 + 2H_2 \quad (Eq.2)$$

These reactions have a theoretical yield of hydrogen production, by weight and without taking water into account, of respectively 8.2% and 15.2%. However, these reactions are always more or less blocked by the formation of an $Mg(OH)_2$ hydroxide layer, which limits their interest in practice.

An object of the invention is therefore to provide a material whose use allows producing hydrogen by hydrolysis, or electricity from this hydrogen, and offers improved conversion efficiency.

BRIEF SUMMARY OF THE INVENTION

For this purpose, the invention relates to the use of a material for producing hydrogen and electricity, wherein the material comprises, to at least 50% by mass of a reagent intended to hydrolyze upon contact with an aqueous solution in order to obtain hydrogen, wherein the reagent comprises:
a first compound chosen from magnesium metal, magnesium hydride, and mixtures thereof, and
a second compound alloyed with the first compound, wherein the second compound is chosen from graphite, carbon fibers, and mixtures thereof,
wherein the first compound represents at least 75% by weight of the reagent, while the second compound represents between 1% and 25%, preferably between 3% and 10%, by weight of the reagent.

In the present application, the terms "hydrogen" and "dihydrogen" are used interchangeably and denote dihydrogen in the gaseous state.

According to particular embodiments, the aforementioned use comprises one or more of the following characteristics, taken in any technically feasible combination:
the first compound is further alloyed or mixed with one or more metals, for example transition metals, representing in total between 2% and 10% by weight of the reagent, while the carbon compound represents between 2% and 10% by weight of the reagent;
the first compound is combined with nickel representing between 2% and 10% by weight of the reagent, preferably between 3% and 7% by weight of the reagent, wherein the carbon compound preferably represents between 3% and 7% by weight of the reagent;
the reagent comprises less than 5% by weight, preferably less than 1% by weight, of elements other than magnesium metal, magnesium hydride, graphite, carbon fibers, and transition metals;
the material has a pellet or a bar shape and is intended to be placed in a hydrolysis reactor; and
the reagent comprises a compacted powder with a porosity of between 20% and 40%; and
the use implements a capsule comprising the material, and optionally a reservoir of an aqueous solution, preferably comprising at least 1% by weight of sodium chloride.

The invention also relates to a method for producing hydrogen or electricity comprising the following steps:
obtaining a material comprising to at least 50% by weight of a reagent intended to hydrolyze upon contact with an aqueous solution in order to obtain hydrogen, wherein the reagent comprises: a first compound chosen from magnesium metal, magnesium hydride, and mixtures thereof; and a second compound alloyed with the first compound, wherein the second compound is selected from graphite, carbon fibers, and mixtures thereof; wherein the first compound represents at least 75% by weight of the reagent, while the second compound represents between 1% and 25%, preferably between 3% and 10%, by weight of the reagent,
contacting the material with an aqueous solution, and at least partial hydrolysis of the reagent of the material by the aqueous solution to obtain gaseous hydrogen,
recovering at least part of the hydrogen obtained, and
optionally, production of electricity from the recovered hydrogen.

According to particular embodiments, the method comprises one or more of the following characteristics, taken in any technically feasible combination:
the aqueous solution comprises between 2% and 10%, preferably between 2 and 5%, in particular 3.5%, by weight of sodium chloride; and
the reagent comprises magnesium hydride, and the aqueous solution has a pH lower than 7, preferably lower or equal to 5.

The invention finally relates to a device for producing hydrogen or electricity comprising:

at least one hydrolysis reactor capable of contacting a material with an aqueous solution, wherein the material comprises, to at least 50% by weight, a reagent intended to hydrolyze upon contact with an aqueous solution to obtain hydrogen, wherein the reagent comprises: a first compound selected from magnesium metal, magnesium hydride, and mixtures thereof; and a second compound alloyed with the first compound, wherein the second compound is selected from graphite, carbon fibers, and mixtures thereof; wherein the first compound represents at least 75% by weight of the reagent, while the second compound represents between 1% and 25%, preferably between 3% and 10%, by weight of the reagent, wherein the hydrolysis reactor (25) is designed to at least partially hydrolyze the reagent with the aqueous solution in order to obtain gaseous hydrogen, wherein the hydrolysis reactor has at least one outlet for the gaseous hydrogen, and optionally, at least one fuel cell, or at least one combustion engine and an alternator, wherein the fuel cell or the combustion engine has at least one inlet fluidly connected to the outlet of the hydrolysis reactor, the fuel cell, or the combustion engine, while the alternator is designed to produce electricity from the hydrogen coming from the hydrolysis reactor.

BRIEF DESCRIPTION OF THE SEVERAL VIEWS OF THE DRAWINGS

The invention will be better understood upon reading the description which follows, given solely by way of example and with reference to the appended drawings, wherein.

DETAILED DESCRIPTION OF THE INVENTION

Figure 1:
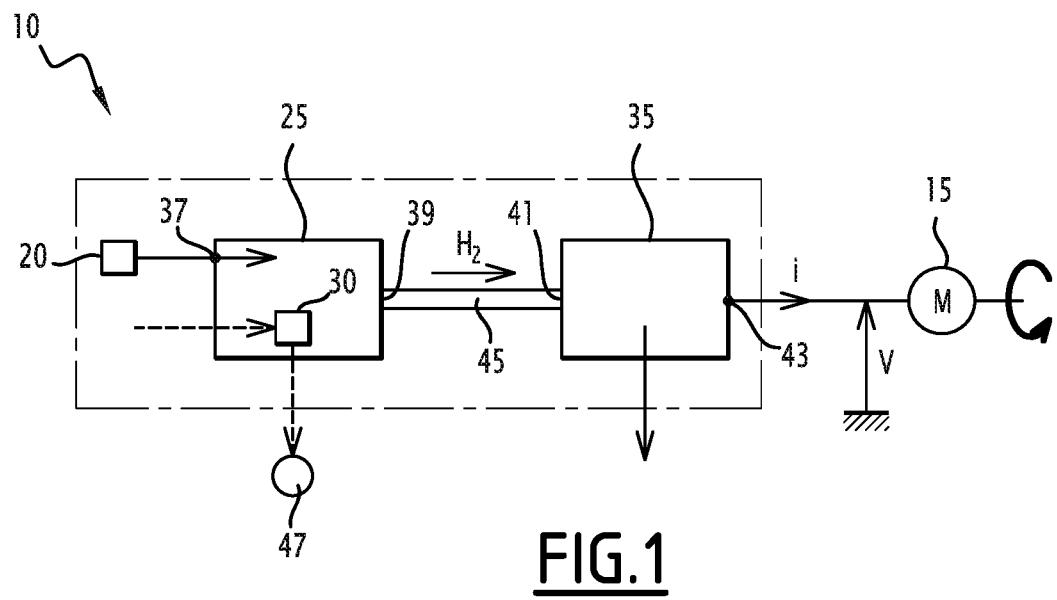
FIG. 1 shows a schematic view of a device for generating electricity according to the invention.

FIG. 1 describes a device 10 for generating electricity according to the invention.

The device 10 is, for example, electrically connected to a motor of a bicycle (not shown).

The device 10 comprises a source of aqueous solution 20, a hydrolysis reactor 25 adapted to contact a material 30 with the aqueous solution to produce hydrogen gas, and a fuel cell 35 designed to produce a current i from the hydrogen produced by the hydrolysis reactor.

In the present application, the terms "hydrogen" and "dihydrogen" are used interchangeably and denote gaseous $H_2$.

Alternatively (not shown), the device 10 comprises a combustion engine (not shown) adapted to burn hydrogen, instead of, or in addition to, the fuel cell 35.

According to another variant (not shown), the device 10 comprises a burner and a thermoelement to produce electricity by the Seebeck effect.

The source of aqueous solution 20 is, for example, a reservoir designed to contain salt water, preferably comprising between 2% and 5% by weight of sodium chloride, for example about 3.5%.

The hydrolysis reactor 25 is designed to receive the material 30 and allow its renewal after use, preferably in the form of a material refill.

The hydrolysis reactor 25 has an inlet 37 fluidically connected to the source of aqueous solution 20, and an outlet 39 for the hydrogen gas so produced.

The hydrolysis reactor 25 is, for example, made entirely of plastic. Alternatively, the hydrolysis reactor 25 may be, for example, made of metal coated with a polymer.

The fuel cell 35 may be, for example, of the PEMFC (polymer electrolyte membrane fuel cell) type, i.e. wherein it comprises a polymer electrolyte membrane.

The fuel cell 35 comprises at least one inlet 41 fluidically connected to the outlet 39 of the hydrolysis reactor 25, and an outlet 43 for the electric current i.

Advantageously, the inlet 41 is connected to the outlet 39 via a line 45.

The total volume of hydrogen available or potentially present in the device 10 is such that the pressure of the gas in the device remains below 10 bars absolute.

Alternatively, the line 45 may be replaced by a connection system (not shown) having this property.

Figure 2:
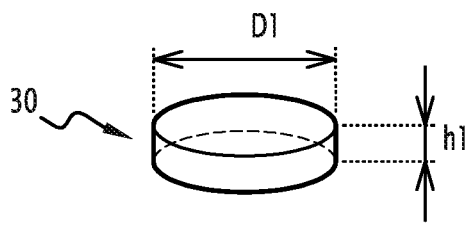
FIGS. 2 and 3 show schematic perspective views respectively of two embodiments of a material according to the invention that may be used in the device represented in FIG. 1, FIGS. 4 and 5 show diagrams representing hydrolysis reaction rates as a function of time for different reagents forming examples and counter-examples of the invention.
Figure 3:
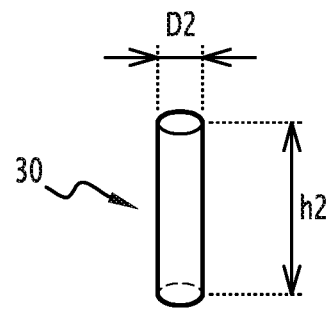

The material 30 advantageously has the form of a pellet or bar as shown respectively in FIGS. 2 and 3 and respectively having diameters D1, D2 and heights h1, h2.

For example, D1 may be between 6 mm and 10 mm, preferably equal to 8 mm, while h1 may be between 8 mm and 15 mm, preferably equal to 10 mm For example, D2 may be between 8 mm and 14 mm, while h2 may be between 15 mm and 150 mm According to a particular embodiment, in the case where the material 30 has a pellet shape, the hydrolysis reactor 25 is advantageously designed to receive several pellets, for example stacked on top of each other. It is then advantageously possible to adjust the capacity of the hydrolysis reactor 25 involved ("step by step" use).

The material 30 is advantageously porous with a porosity of, for example, between 30% and 35% by volume. The porosity is advantageously calculated or measured, for example, by means of a scanning electron microscope.

The material 30 is, for example, made, as will be seen in the examples below, by compacting a powder (not shown), for example uniaxially.

The powder consists of a reagent comprising a first compound, for example magnesium metal, alloyed with a second carbon compound, such as graphite or carbon fibers.

Alternatively, the first compound may be $MgH_2$ (magnesium hydride) or a mixture of magnesium metal and magnesium hydride.

In particular, when the first compound comprises magnesium hydride, the aqueous solution intended to hydrolyze the reagent is advantageously acidic, for example with a pH of less than or equal to 7, in particular less than or equal to 5.

The first compound is at least 75% by weight of the reagent, while the second compound is between 1% and 25%, preferably between 3% and 15% by weight of the reagent. For example, apart from the impurities, the reagent consists of 90% by weight of magnesium metal alloyed with graphite.

According to one variant, the reagent is such that the first compound is furthermore alloyed with one or more transition metals, for example nickel, representing in total between 2% and 15% by weight of the reagent, wherein the second compound then also represents between 2% and 15% by weight of the reagent.

Preferably, the transition metal(s) alloyed with the first compound represent between 3% and 7% by weight of the reagent, while the second compound preferably also represents between 3% and 7% by weight of the reagent. For example, the reagent may be made up of 90% magnesium metal, 5% graphite, and 5% nickel.

According to a particular embodiment, the material 30 comprises a binder in addition to the powdered reagent, According to another particular embodiment, the powder constituting the reagent is pelletized to a support in the material 30.

According to another embodiment (not shown), the material is included in a capsule incorporating the source of aqueous solution 20.

For example, the capsule may comprise a lower part in which the material 30 is located, and an upper part forming a reservoir comprising the aqueous solution.

The upper part and the lower part are advantageously related by an axis of rotation, wherein they pivot relative to each other about the axis of rotation. The lower and upper parts have circular shaped openings. The lower and upper parts are separated by a seal. The lower and upper parts are rotatable between a closed position, in which the openings are not coincident, and an open position, in which the openings are coincident.

Upon placing the capsule in a receptacle of the hydrolysis reactor, the upper part of the capsule pivots and causes the openings of the upper part and the lower part to coincide. Upon closing a cover (not shown) of the receptacle to seal the system, the top of the capsule is perforated. The aqueous solution then flows onto the material and the hydrolysis reaction begins.

The hydrogen escapes via an orifice in the upper part.

According to another embodiment (not shown), the hydrolysis reactor 25 comprises a reservoir, for example in the form of a tube, which contains the aqueous solution of NaCl, and a pump adapted so that a controlled quantity of aqueous solution contacts the material 30.

The tube may be, for example, fitted at a longitudinal end in a tube support. A capsule holder is advantageously fitted on the other longitudinal end of the tube.

The pump may be, for example, located in the tube in order to cause the aqueous solution to rise via orifices, for example two, of the capsule holder. The system may be, for example, refilled with aqueous solution via a central conduit in the capsule. A level sensor is used to warn a user of the need for refilling.

A capsule containing the material 30 may be, for example, closed by a lid located in the upper part.

The capsule holder is designed to receive the capsule. A hinged cover closes the capsule holder and perforates the lid of the capsule by means of nozzles fixed on the cover and projecting towards the inside of the capsule holder. The nozzles are adapted to irrigate the material 30. The nozzles are connected to a system of conduits in the cover which connect the two holes of the capsule holder when the cover is closed.

An O-ring ensures the seal between the cover and the capsule holder. Hydrogen produced by hydrolysis is recovered in an upper part of the cover (which is therefore pierced) by a tapping connection. A hydride reservoir downstream of the tapping connection advantageously absorbs overpressures in the hydrogen so produced.

In this embodiment as in the others, an expansion valve (not shown) and/or a non-return valve are optionally present in the conduit 45.

According to another embodiment (not shown), the material 30, in the form of pellets, is placed in a cylinder. The cylinder is introduced into a sheath of the hydrolysis reactor 25, wherein the sheath has a shape that is designed to lock the cylinder rotationally relative to the hydrolysis reactor.

The sheath is closed by a cover after introduction of a reservoir of the aqueous solution. The reservoir is placed on a rotating ring driven rotationally relative to the cylinder, for example by a stepping motor.

The rotating ring is located at the top of the reservoir. As the ring rotates, a pellet of material 30 falls into the rotating ring and is driven until a opening in the ring becomes coincident with a opening at the top of the reservoir. The pellet then falls into the reservoir, which then initiates the hydrolysis reaction.

In this embodiment, the hydrolysis reaction is controlled by dropping the pellets selectively into the reservoir.

A method of producing electricity according to the invention, that illustrates the operation of the device 10, will now be described.

The method comprises a step of obtaining the material 30, a step of contacting the material with the aqueous solution, and hydrolysis of the aqueous solution with the reagent of the material to obtain hydrogen gas, a recovery step of the hydrogen obtained, and a step of producing electricity in the fuel cell from the recovered hydrogen.

The material 30 obtained is, for example, of the first type mentioned above, i.e. it consists of a compacted powder, that is itself made of magnesium metal alloyed with graphite.

The material 30 is placed inside the hydrolysis reactor 25.

The aqueous solution from the aqueous solution source 20 enters the hydrolysis reactor 25 through the inlet 37 and is brought into contact with the material 30.

The reagent of the material 30 is hydrolysed by the aqueous solution, which causes the release of hydrogen gas. This hydrogen is recovered and led to the outlet 39 of the hydrolysis reactor. The material is loaded with hydroxide as the hydrolysis reaction proceeds.

As will be seen in the following examples, the hydrolysis reaction occurs with good reaction kinetics due to the composition of the material 30, and to a lesser extent due to its structure.

When all the accessible metallic magnesium has been hydroxidized, the used material is removed from the hydrolysis reactor 25 as waste 47 and replaced with a refill of material.

The hydrogen gas produced is recovered at the outlet 39 and conveyed via the conduit 45 to the inlet 41 of the fuel cell 35.

In the fuel cell 35, the hydrogen gas and oxygen of the ambient air are converted into water and the current i to supply the motor 15 is produced.

When the material 30 is of the second type described above as an alternative, i.e. when it consists of a compacted powder of magnesium metal that is alloyed with graphite and nickel, the operation is analogous. However, a synergistic effect is observed in the sense that the Mg—C—Ni reagent appears to be better than the Mg—C reagent and the Mg—Ni reagent taken separately.

EXAMPLES 50 mg samples of powdered material 30 were prepared in the laboratory from 99.9% by weight of pure magnesium from the company STREAM CHEMICALS.

Various samples were prepared: a sample of pure metallic Mg, samples comprising 90% by weight of magnesium metal and 10% by weight of a compound X, wherein X is graphite, carbon fibers, nickel, iron, or aluminum, apart from impurities, and a sample containing 50% by weight of magnesium metal, 5% of graphite and 5% of nickel by weight. Magnesium hydride-based samples were also prepared.

The samples were milled in a ball mill, for example the "Fritsch P5" model in a stainless steel bulb under a hydrogen atmosphere at a pressure of 10 bar, for 5 hours. The milling consisted of 15 minutes of continuous milling, followed by a 2 minute stop to allow the bulb to cool. The bulb was recharged with hydrogen every 30 minutes to ensure a constant hydrogen pressure. The weight ratio between the balls and the powder was 17 to 1, which corresponds to 8 g of powder and 34 stainless steel balls of 10 mm diameter. The rotational speed was set at 250 rpm.

The hydrolysis reaction was carried out using a sodium chloride solution comprising 3.5% by weight of this salt.

The samples were characterized by X-ray diffraction using a Philips PANalytical X'Pert diffractometer (PW1820).

The relative amounts and/or purities of the present phases such as hydrides and metal phases were estimated by X-ray diffraction using EVA software.

Observations were made using a TESCAN VEGA3 SB scanning electron microscope. Auger spectroscopy was used to study the formation of magnesium hydroxide and magnesium chloride on the surface of the reagent.

Particle sizes were measured by laser granulometry using a Mastersizer 2000S device.

The fuel cell used is a conventional PEMFC fuel cell.

The diffractograms showed that milled samples of Mg—Al and Mg-graphite lacked peaks corresponding to $MgH_2$, which means that no Mg-to-hydride conversion occurred during sample preparation. On the other hand, the Mg—Fe and Mg—Ni samples respectively had 24% and 4% of $MgH_2$ in mass.

If $MgH_2$ is present in the material samples 30, an acid is added to the aqueous solution for the hydrolysis. The acid may be, for example, hydrochloric acid.

The dimensions of the particles obtained (average diameter) are specified in Table 1 below.

TABLE 1

| Compound | mass % of $MgH_2$ | Dimension of the particles (μm)[a] | Hydrogen generated Yield (%) | Volume (mL) |
|---|---|---|---|---|
| Mg/10% Fe | 24% | 5-30 | 81 | 19.5 |
| Mg/10% Ni | 4% | 30-40 | 97 | 20 |
| Mg/10% Gr | —[b] | 110 | 100 | 20 |
| Mg et Mg/Al | —[b] | 100 | 45 | 9 |

[a]Median diameter
[b]Not detectable

Then, the samples were brought into contact with 100 cm³ of a solution of sodium chloride at 3.5% by weight, and the kinetics of the reaction were measured.

Furthermore, tests (measurements of flow, pressure, volume released) were also carried out at various temperatures ranging from 0° C. to 40° C. and a significant release of hydrogen was obtained.

Figure 4:
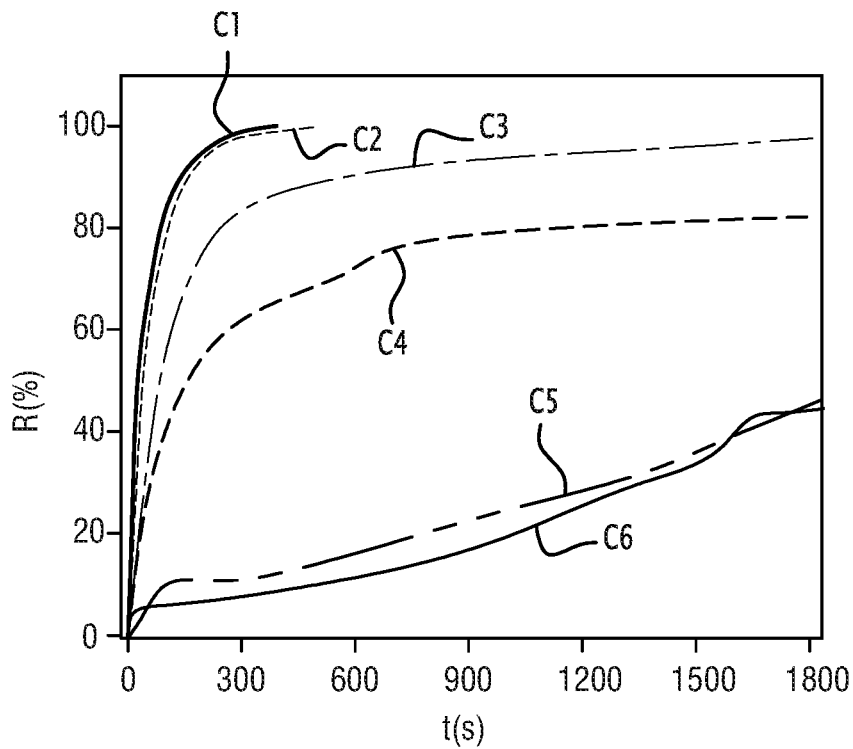
Figure 5:
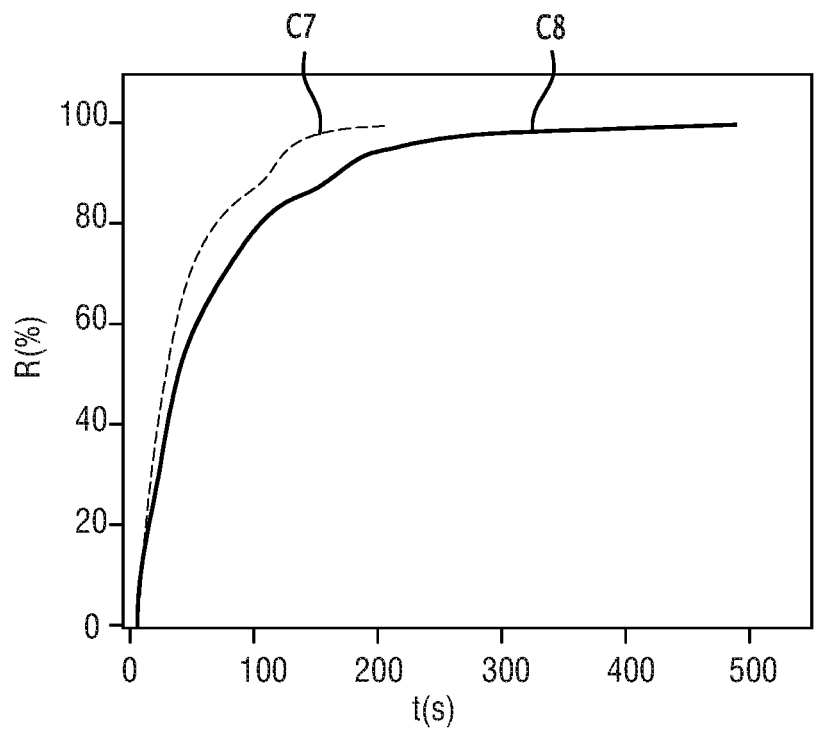

The results are shown in FIGS. 4 and 5 which show the reaction rates obtained as a function of time for the different samples.

The same yields were obtained with other pellets with a 30% porosity, and having the compositions corresponding to the first three rows of Table 1 (Fe, Ni and graphite).

The reaction rate is expressed as a percentage, 100% meaning that the reaction is complete.

FIG. 4 shows a curve C1 corresponding to an Mg-graphite sample, a curve C2 corresponding to Mg-carbon fibers, a curve C3 corresponding to Mg—Ni, a curve C4 corresponding to Mg—Fe, a curve C5 corresponding to Mg—Al, and a curve C6 corresponding to pure Mg.

It appears that the samples in which magnesium metal is associated with 10% of a carbon compound have the best reaction kinetic.

In FIG. 5, the kinetics of the hydrolysis reaction are compared with a sample of Mg-graphite-nickel at 5% by mass of graphite and 5% by mass of nickel (curve C7) and with a sample of Mg-graphite at 10% by weight of graphite (curve C8). It appears that graphite and nickel act synergistically to improve the reaction kinetics compared to Mg-graphite or Mg-nickel samples.

The comparison of the surface state of the Mg-graphite-Ni and Mg-graphite samples with a scanning electron microscope suggests that the presence of 10% by mass of graphite would be sufficient to reach an optimum speed of the reaction. Without being bound by any theory, the inventors believe that graphite plays a role of an anti-abrasive or lubricant that facilitates "detachment" of magnesium fragments in the material 30, i.e. effervescence.

Hydrogen was produced using samples containing magnesium hydride and was sent to the fuel cell. It was thus possible to produce a current of 0.15 A at a voltage of 0.52 V for 35 minutes from a single pellet. The use of several pellets, for example stacked, as described above, allows a greater intensity or voltage to be obtained by addition.

Such a current may, in particular, power an electric motor that is designed to provide supplementary force to a bicycle.

Figure 6:
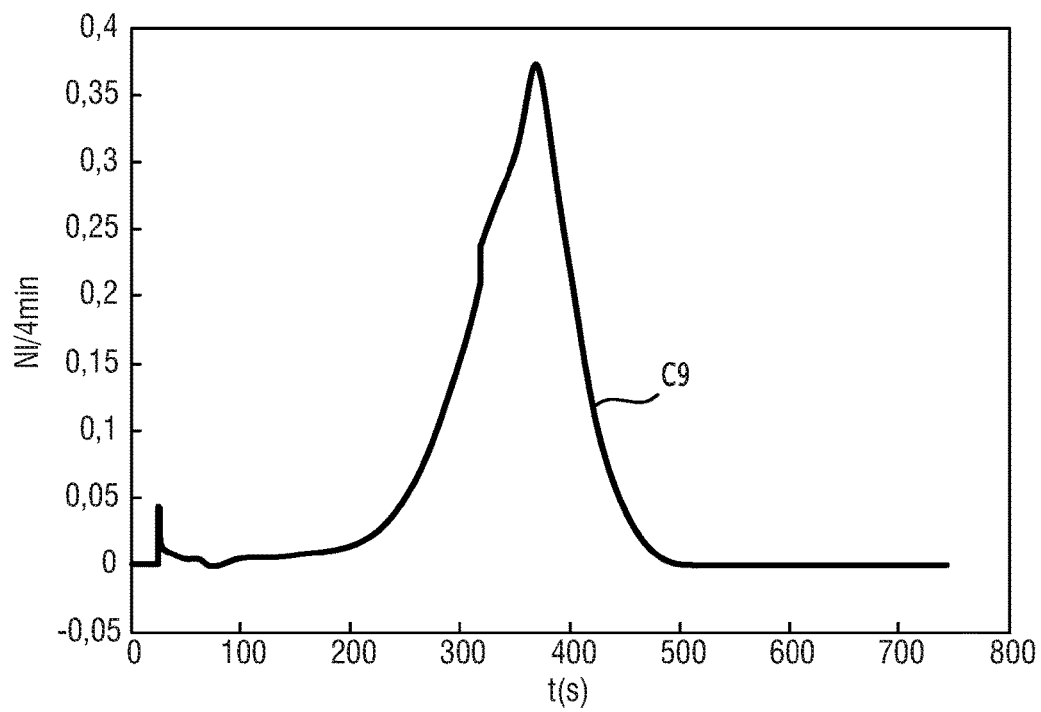
FIG. 6 shows a graph showing the hydrogen production rate obtained from a material according to the invention.

In another example, a pellet of 1.02 g of material 30 was prepared. The pellet was made by compacting a powder comprising magnesium metal and 10% by weight of graphite. The pellet was then immersed in an aqueous solution comprising 3.5% by weight of NaCl. The hydrogen so produced was collected. The hydrogen flow rate, in Nl/min, is plotted as a function of time in seconds in the curve C9 in FIG. 6. Heating of the solution was observed, but was limited to about 15° C.

In this example, "Nl" means one liter taken under normal conditions of temperature and pressure (0° C. and 101325 Pa).

As may be seen from curve C9, the experiment produced a hydrogen flow rate of more than 0.35 Nl/min. The total amount of hydrogen so produced was about 0.7 Nl, which is in accordance with the expected theoretical value, taking into account leaks in the experimental device and the accuracy of the flowmeter used.

As a result of the characteristics described above, the material 30 is suitable for the production of hydrogen by hydrolysis, or the production of electricity from this hydrogen, with good conversion efficiency.

The material according to the invention makes it possible at the same time to improve the yield and the kinetics of transformation. In addition, the material exhibits improved aging behavior (calendar storage) because the hydrolysis reaction reagents may be stored independently for prolonged periods without alteration.

According to one embodiment of the invention, the device 10 for producing electricity comprises means for regulating the pressure within the reactor by controlling the amount of aqueous solution brought into contact with the material 30. To this end, the device 10 comprises a solenoid valve controlled in PWM mode and arranged at the inlet 37 of the reactor, and a pressure sensor arranged at the reactor. The pressure sensor measures the pressure and this information is compared to a given pressure setpoint. According to the result of this comparison, a control is created and applied to the solenoid valve to increase or decrease the flow of the arrival of the aqueous solution to regulate the pressure in the reactor. This regulation of the pressure in the reactor has the advantage of optimizing the charging of the battery.

According to another embodiment, the device 10 for generating electricity comprises a servo loop connected to the control loop. To this end, the device 10 comprises a means for measuring the current available at the level of the fuel cell 35. The measurement of the current generated by the battery may be used to anticipate the consumption of hydrogen, without waiting for the control loop to detect the pressure drop in the hydrolysis reactor 25.

According to one embodiment, the reagent is such that the first compound is alloyed or mixed with one or more metals. By way of example, the alloy and/or related metals may be the following: aluminum, zinc, iron, nickel, zirconium, titanium, cobalt, copper and manganese.

Five material samples were prepared for this purpose: Mg—Ni—C, Mg—Al—Zn, Mg—Al—Zn+5% C, AZ91, AZ91+5% C. Their composition as a percentage by weight is specified in Table 2 below. AZ91C corresponds to the AZ91 alloy to which 5% of C was added.

TABLE 2

| Material | Mg | Al | Zn | C | Ni | Hydrogen yield |
|---|---|---|---|---|---|---|
| AZ91 | 90% | 9% | 1% | — | — | 93% |
| AZ91C | 90% | 9% | 1% | 5% | — | 96% |
| Mg Ni C | 90% | — | — | 5% | 5% | 98% |
| Mg Al Zn | 90% | 9% | 1% | — | — | 100% |
| Mg Al Zn C | 85% | 9% | 1% | 5% | — | 79% |

The samples AZ91 and AZ91C are alloys. The AZ91 alloy is a magnesium alloy commonly used in aeronautics and may be recycled and recovered in the production of hydrogen. AZ91C further comprises 5% carbon to improve the efficiency of ball milling, because carbon is a lubricating agent, minimizes the welding phenomenon between the grains, and therefore leads to a powder with a large specific surface area and therefore better contact between magnesium and water.

The Mg—Ni—C, Mg—Al—Zn and Mg—Al—Zn—C samples are, for example, mixtures of metal powders that are advantageously elemental.

According to the present invention, two compounds form an "alloy" when there are chemical bonds between them, unlike a mixture, in which there is no chemical interaction between the different compounds.

Then, these samples were brought into contact with an aqueous solution containing 3.5% by weight of sodium chloride and the kinetics of the reaction were measured.

Figure 7:
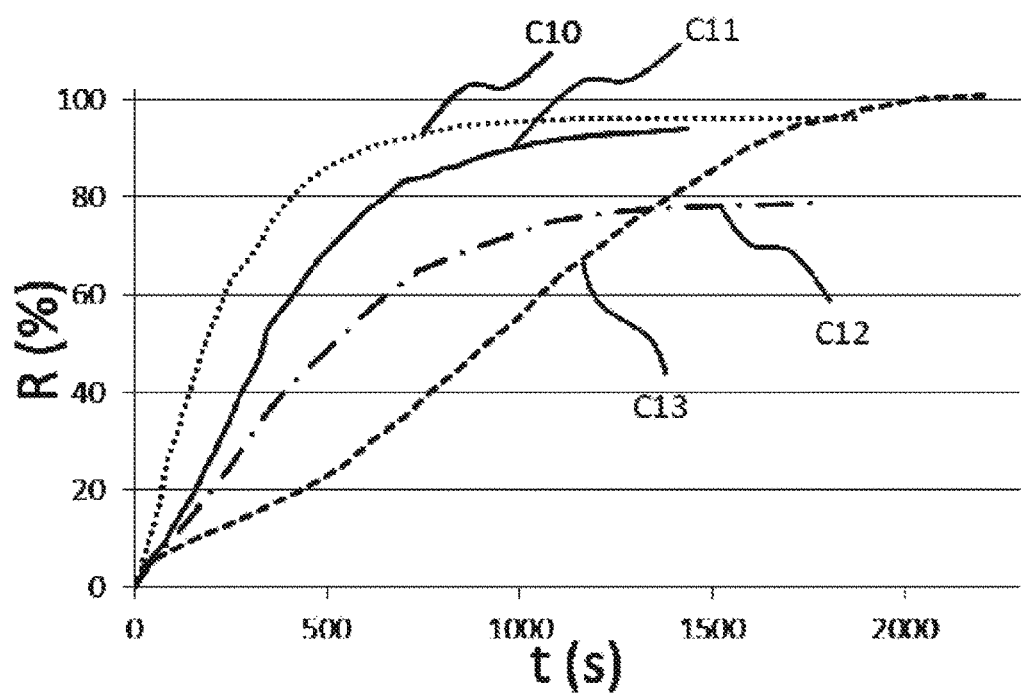
FIG. 7 shows a graph illustrating the production of hydrogen as a function of time by the hydrolysis reaction, for example in a 35 g/l aqueous solution of NaCl, of four samples.

FIG. 7 shows the reaction rate obtained as a function of time for four samples. In FIG. 7, the curve C10 corresponds to the sample AZ91C, the curve C11 to AZ91, the curve C12 to Mg—Al—Zn and the curve C13 to Mg—Al—Zn—C.

It appears, first of all, that the kinetics and the yield of the hydrolysis reaction are different between the powder resulting from the milling of the AZ91 alloy and the mixtures of metal powders.

In FIG. 7, if the hydrolysis reaction kinetics for a Mg—Al—Zn mixture sample (C12 curve) and an AZ91 alloy sample (C11 curve) are compared, it appears that the AZ91 alloy shows better performance. Without being bound by any theory, the inventors assume that the defined compound (Al12Mg17), present in the AZ91 alloy, has an effect related in particular to the reduction of aluminum during the hydrolysis and therefore faster hydrolysis kinetics. Similarly, the presence of a solid solution of MgZn formulation probably plays a role in the kinetics.

Moreover, if we compare the hydrolysis reaction kinetics for a carbon-free sample (C11, C12 curves) and for a sample with carbon (C10, C13 curves), the results show that the presence of carbon makes it possible to increase the kinetics of the reaction. In fact, the presence of carbon avoids, during milling, the generation of $MgH_2$ which tends to slow down the reaction. The anti-abrasive effect of carbon helps protect Mg particles.

In order to study the effect of compactness on the kinetics of hydrolysis, samples of 0.2 g and 6 mm diameter pellets were prepared from the powders that gave the best results in terms of hydrolysis kinetics, the Mg—Ni—C mixture and the AZ91-C alloy. Three different pelletizing pressures: 700, 400 and 100 MPa for the same duration of application, set at 5 minutes, were tested.

The density and measured compactness of the samples are specified in Table 3 below.

TABLE 3

Size, density and compactness of the 6 mm diameter pellets for Mg—Ni—C powder and AZ91-C powder.

| | | Diameter (mm) | Height (mm) | Density | Compactness (%) |
|---|---|---|---|---|---|
| Mg—Ni—C | 700 MPa | 6 | 4 | 1.72 | 94.5 |
| | 400 MPa | 6 | 4 | 1.7 | 93 |
| | 100 Mpa | 6 | 4.6 | 1.52 | 83.5 |
| AZ91-C | 700 MPa | 6 | 4 | 1.71 | 89.5 |
| | 400 MPa | 6 | 4.6 | 1.58 | 83 |
| | 100 MPa | 6 | 5.5 | 1.3 | 68 |

These samples were then brought into contact with a 3.5% by weight of aqueous solution of sodium chloride, and their reaction kinetics were measured.

Figure 8:
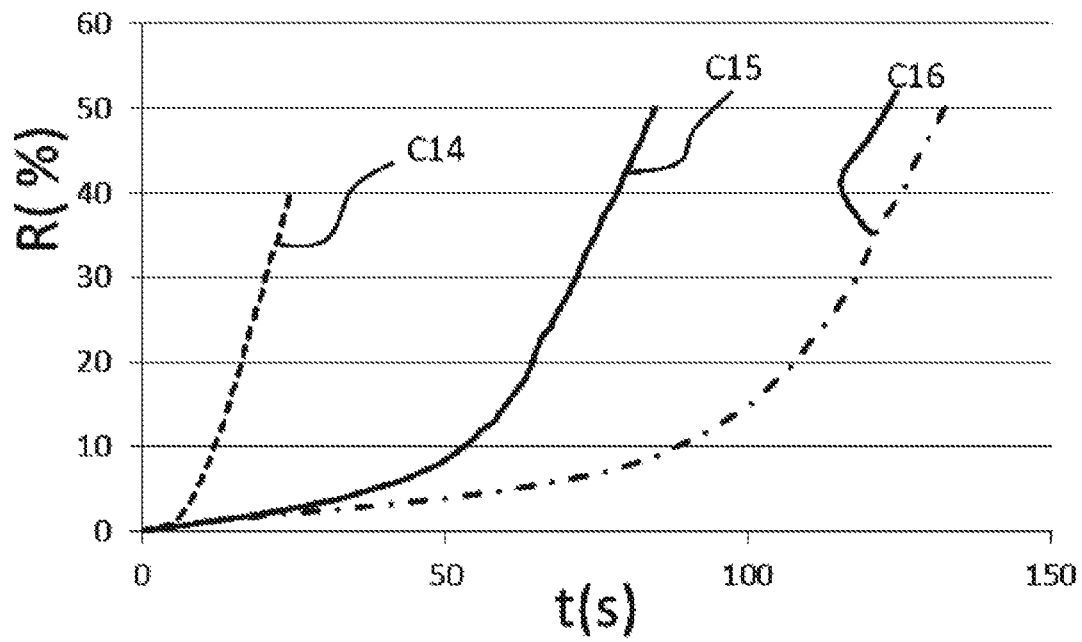
FIG. 8 shows a graph illustrating the production of hydrogen as a function of time by the hydrolysis reaction, for example in a 35 g/l aqueous solution of NaCl, of Mg—Ni—C at various pelletizing pressures.
Figure 9:
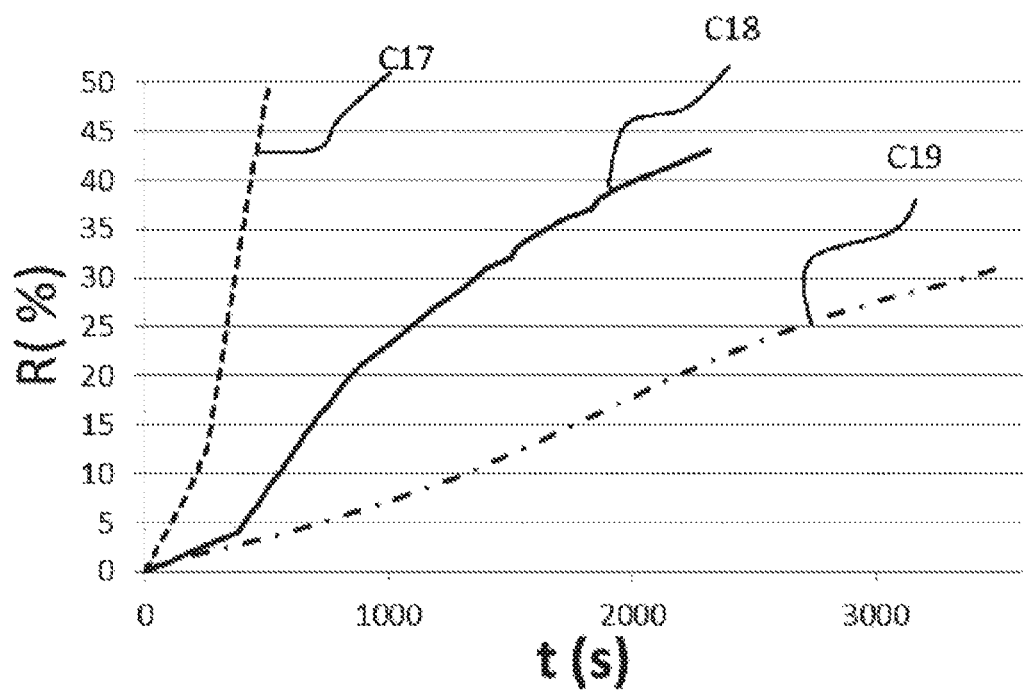
FIG. 9 shows a graph illustrating the production of hydrogen as a function of time by the hydrolysis reaction, for example in a 35 g/l aqueous solution of NaCl, of a particular sample at different pelletizing pressures.

FIGS. 8 and 9 illustrate the reaction rate obtained as a function of time for the six samples of Table 3.

In FIG. 8, the kinetics of the Mg—N—C sample are compared for the three pelletizing pressures. Curve C14 corresponds to a sample of Mg—N—C having been subjected to a pressure of 100 MPa, curve C15 to a pressure of 400 Mpa, and curve C16 to a pressure of 700 MPa.

In FIG. 9, the kinetics of the sample AZ91-C is compared for the three pelletizing pressures. Curve C17 corresponds to a sample of AZ91-C having been subjected to a pressure of 100 MPa, the curve C18 to a pressure of 400 MPa and the curve C19 to a pressure of 700 MPa.

It may be seen that the samples whose pelletizing pressure is at 100 MPa are the fastest. The reaction time to reach 50 mL of hydrogen is of the order of 5 minutes. The pelletizing pressure should be minimized to reduce compactness.

The invention claimed is:

1. A use of a material for producing hydrogen or electricity, wherein the material comprises at least 50% by mass of a reagent intended to hydrolyze upon contact with an aqueous solution in order to obtain hydrogen, wherein the reagent comprises:
    a first compound chosen from magnesium metal, magnesium hydride, and mixtures thereof, and
    a second compound alloyed with the first compound, wherein the second compound is chosen from graphite, carbon fibers, and mixtures thereof,
    wherein the first compound represents at least 75% by weight of the reagent, and the second compound represents between 1% and 25% by weight of the reagent.

2. The use according to claim 1, wherein the first compound is furthermore alloyed or mixed with one or more metals representing in total between 2% and 10% by weight of the reagent, wherein the carbon compound represents between 2% and 10% by weight of the reagent.

3. The use according to claim 2, wherein the first compound is alloyed with nickel representing between 2% and 10% by weight of the reagent.

4. The use according to claim 1, wherein the reagent comprises less than 5% by weight of elements other than magnesium metal, magnesium hydride, graphite, carbon fibers, and transition metals.

5. The use according to claim 1, wherein the material has the shape of a pellet or a bar and is intended to be placed in a hydrolysis reactor.

6. The use according to claim 1, wherein the reagent comprises a compacted powder of porosity between 20% and 40%.

7. The use according to claim 1, implementing a capsule comprising the material, and optionally a reservoir of an aqueous solution.

8. The use according to claim 1, wherein the second compound represents between 3% and 10% by weight of the reagent.

9. The use according to claim 3, wherein nickel represents between 3% and 7% by weight of the reagent.

10. The use according to claim 3, wherein the carbon compound represents between 3% and 7% by weight of the reagent.

11. The use according to claim 4, wherein the reagent comprises less than 1% by weight of elements other than magnesium metal, magnesium hydride, graphite, carbon fibers, and transition metals.

12. The use according to claim 7, wherein the aqueous solution comprises at least 1% by weight of sodium chloride.

13. A method for producing hydrogen or electricity comprising the following steps:
    obtaining a material comprising at least 50% by weight of a reagent intended to hydrolyze in contact with an aqueous solution in order to obtain hydrogen, wherein the reagent comprises: a first compound selected from the group consisting of magnesium metal, magnesium hydride, and mixtures thereof; and a second compound alloyed with the first compound, wherein the second compound is selected from graphite, carbon fibers, and mixtures thereof; and wherein the first compound represents at least 75% by weight of the reagent, and the second compound represents between 1% and 25% by weight of the reagent,
    contacting the material with an aqueous solution, and at least partially hydrolyzing the reagent of the material with the aqueous solution to obtain gaseous hydrogen,
    recovering at least part of the hydrogen obtained, and
    optionally, producing electricity from the recovered hydrogen.

14. The method according to claim 13, wherein the aqueous solution comprises between 2% and 10% by weight of sodium chloride.

15. The method according to claim 13, wherein the reagent comprises magnesium hydride and the aqueous solution has a pH of less than 7.

16. The method according to claim 13, wherein the second compound represents between 3% and 10% by weight of the reagent.

17. The method according to claim 14, wherein the aqueous solution comprises between 2 and 5% by weight of sodium chloride.

18. The method according to claim 14, wherein the aqueous solution comprises 3.5% by weight of sodium chloride.

19. The method according to claim 15, wherein the pH is lower than or equal to 5.

20. A device for producing hydrogen or electricity comprising:
    at least one hydrolysis reactor designed to bring a material into contact with an aqueous solution, wherein the material comprises at least 50% by weight of a reagent designed to hydrolyze upon contact with an aqueous solution in order to obtain hydrogen, wherein the reagent comprises: a first compound selected from magnesium metal, magnesium hydride, and mixtures thereof; and a second compound alloyed with the first compound, wherein the second compound is selected from graphite, carbon fibers, and mixtures thereof; wherein the first compound represents at least 75% by weight of the reagent, and the second compound represents between 1% and 25% by weight of the reagent, wherein the hydrolysis reactor is designed to at least partially hydrolyze the reagent with the aqueous solution in order to obtain gaseous hydrogen, wherein the hydrolysis reactor has at least one outlet for the gaseous hydrogen, and
    optionally, at least one fuel cell, or at least one combustion engine with an alternator, wherein the fuel cell or the combustion engine has at least one inlet fluidically connected to the outlet of the hydrolysis reactor, wherein the fuel cell, or the combustion engine with the alternator, is designed to produce electricity from the hydrogen from the hydrolysis reactor.

21. The device according to claim 20, wherein the second compound represents between 3% and 10% by weight of the reagent.

* * * * *